(12) United States Patent
Hashiba

(10) Patent No.: US 8,354,763 B2
(45) Date of Patent: Jan. 15, 2013

(54) MAGNET GENERATOR

(75) Inventor: Mitsuharu Hashiba, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 233 days.

(21) Appl. No.: 12/854,651

(22) Filed: Aug. 11, 2010

(65) Prior Publication Data
US 2011/0241459 A1 Oct. 6, 2011

(30) Foreign Application Priority Data

Apr. 2, 2010 (JP) ................................ 2010-085995

(51) Int. Cl.
*H02K 9/00* (2006.01)
(52) U.S. Cl. .......................................... 310/54; 310/64
(58) Field of Classification Search .................. 310/52, 310/54, 58, 64, 74
See application file for complete search history.

(56) References Cited

U.S. PATENT DOCUMENTS

| 6,469,407 | B2 | 10/2002 | Welke et al. | |
|---|---|---|---|---|
| 6,713,934 | B2 * | 3/2004 | Kanno | 310/254.1 |
| 6,819,016 | B2 * | 11/2004 | Houle et al. | 310/52 |
| 6,992,411 | B2 | 1/2006 | Houle et al. | |
| 7,078,841 | B2 | 7/2006 | Yokota | |
| 7,154,202 | B2 * | 12/2006 | Hashiba et al. | 310/74 |
| 2002/0005671 | A1 | 1/2002 | Welke et al. | |
| 2004/0012272 | A1 | 1/2004 | Houle et al. | |
| 2005/0067904 | A1 | 3/2005 | Houle et al. | |
| 2007/0057582 | A1 * | 3/2007 | Hashiba et al. | 310/58 |

FOREIGN PATENT DOCUMENTS

| JP | 53-51407 | | 5/1978 |
|---|---|---|---|
| JP | 09-093869 | A | 4/1997 |
| JP | 2002-058182 | A | 2/2002 |
| JP | 2003-333801 | A | 11/2003 |
| JP | 2004-135382 | A | 4/2004 |
| JP | 2004-274907 | A | 9/2004 |
| JP | 2005-130587 | A | 5/2005 |
| JP | 2006-502685 | A | 1/2006 |

OTHER PUBLICATIONS

Japanese Office Action dated Apr. 17, 2012 for corresponding Japanese Application No. 2010-085995.

* cited by examiner

*Primary Examiner* — Nguyen N Hanh
(74) *Attorney, Agent, or Firm* — Sughrue Mion, PLLC

(57) ABSTRACT

In a flywheel-type magnet generator, a heat dissipation member which has no relation with a magnetic circuit is fitted into a space formed by cutting a bulk of a laminated core used for configuring the magnetic circuit, a cooling tube installed to be inserted into or penetrate the heat dissipation member is provided, and by supplying a cooling medium to the cooling tube, cooling performance of the stator is enhanced.

13 Claims, 11 Drawing Sheets

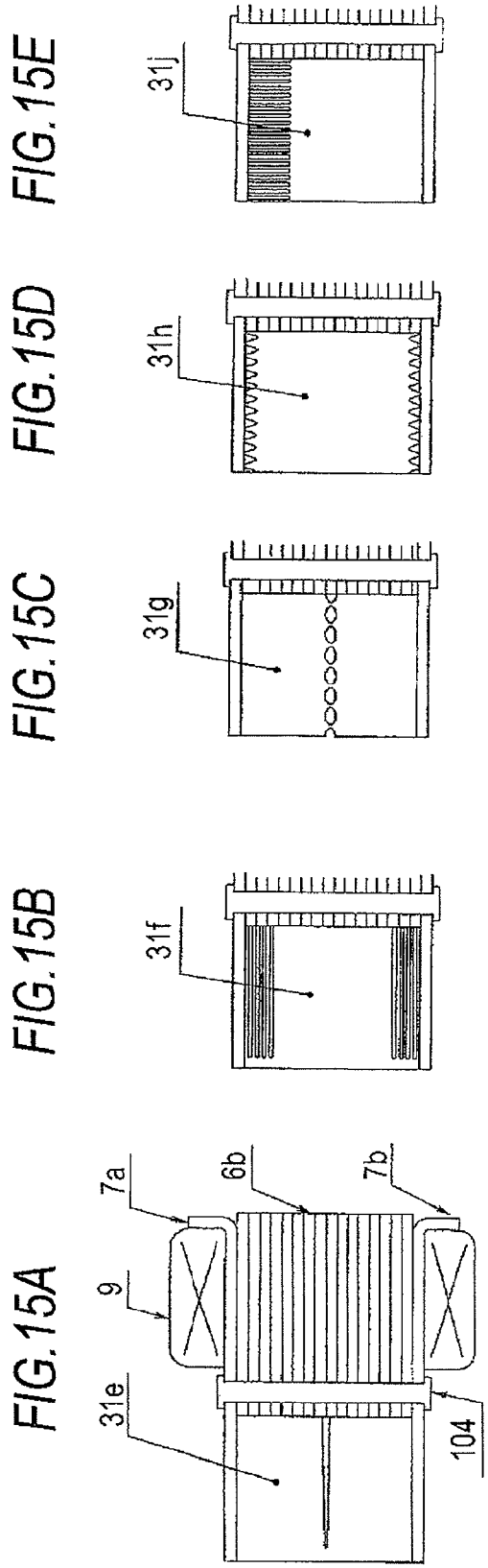

FIG.16B
FIG.16A
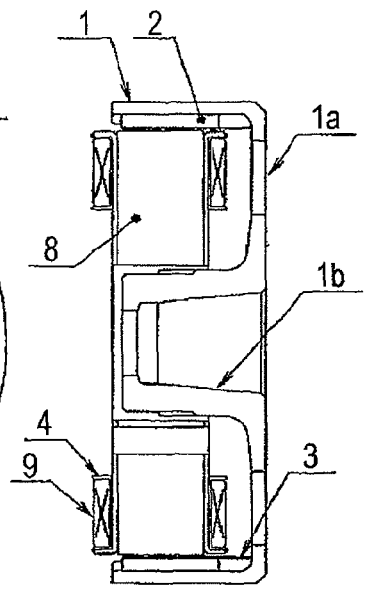
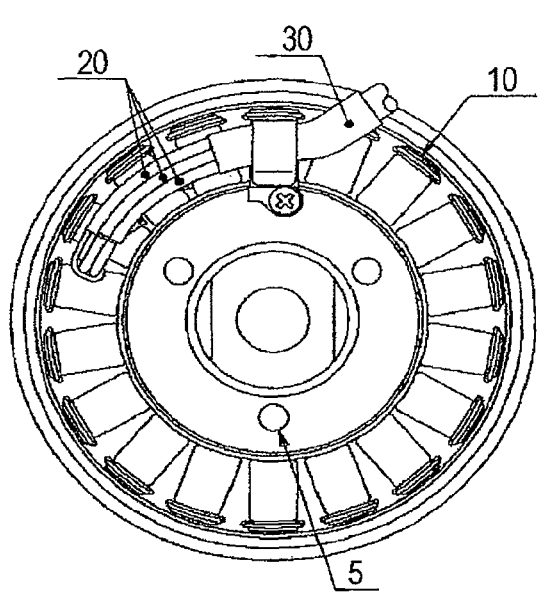
FIG.17
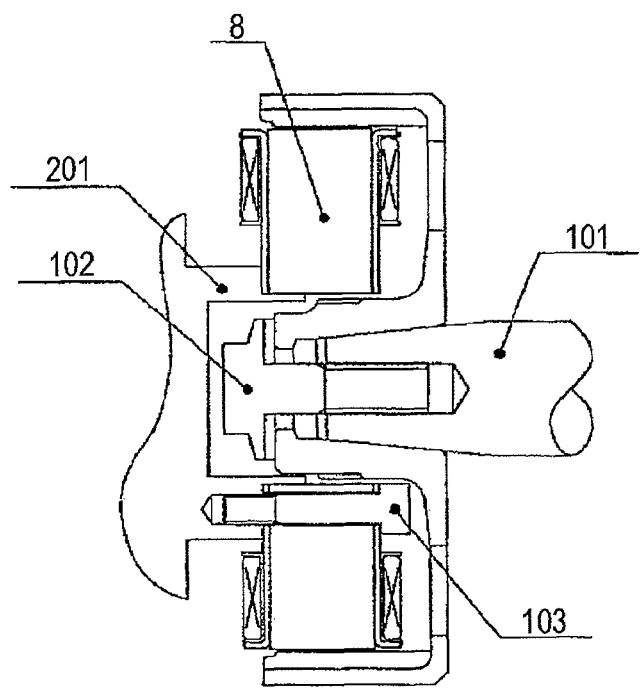

MAGNET GENERATOR

BACKGROUND OF THE INVENTION

1. Field of the Invention

The present invention relates to a magnet generator for generating power by an electromagnetic induction between a magnet and an armature winding due to rotation of a flywheel.

2. Description of the Related Art

FIGS. 16A, 16B, 17 and 18 illustrate an example of an existing flywheel-type magnet generator. FIG. 16A is a side cross-sectional view, FIG. 16B is a plan cross-sectional view, FIG. 17 is a diagram illustrating a state where a laminated core of the magnet generator is fastened (mounted) to a rotation shaft of an internal combustion engine shaft or the like using a flange bolt, and FIG. 18 illustrates an example of the existing laminated core.

In FIGS. 16A, 16B, 17, and 18, reference numeral 1 denotes a flywheel which is a rotor forming a bowl-shaped contour and including a vent 1a and a boss 1b to be fitted to the internal combustion engine shaft or the like. Reference numeral 2 denotes a plurality of magnets arranged on a cylindrical inner wall part of the flywheel 1 in a peripheral direction. Reference numeral 3 denotes a cylindrical protection ring for preventing scattering of the magnets 2. Reference numeral 4 denotes an insulating member (resin) of a laminated core 8 and a winding coil 9 which are described later. Reference numeral 5 denotes a mounting hole for fastening and fixing the laminated core 8. The laminated core denoted by reference numeral 8 is, as illustrated in FIG. 18, configured by integrating a plurality of thin steel sheets (intermediate plates) 6a and single plates (end plates) 7a and 7b provided on both sides thereof, using a plurality of caulking members (for example, rivets) 104. Reference numeral 9 denotes the winding coil wound around the laminated core 8. Reference numeral 10 denotes a stator configured with the laminated core 8, the insulating member 4, and the winding coil 9. Reference numeral 20 denotes a connection part for connection between the winding coil 9 and an output lead 30 for taking out a current of the magnet generator.

In the flywheel-type magnet generator configured as described above, as illustrated in FIG. 17, the laminated core 8 is fastened (mounted) to a rotation shaft 101 of the internal combustion engine or the like by a flange bolt 102, and the stator 10 is fixed to an engine case cover (or an engine block) 201 by a mounting bolt 103.

The related art is disclosed in JP-A-2003-333801.

In the laminated core 8 of the stator of the existing magnet generator, a reduction in iron loss (heat generation of the laminated core) has been attempted by laminating a plurality of the thin steel sheets 6a for suppressing heat generation due to an eddy current. Moreover, in the flywheel 1 of the rotor, in order to effectively utilize ventilating convection and agitating convection during rotation, providing a vent 1a that is as large as possible and a fin made of a resin material have been considered.

However, the existing stator structure described above has only a change in the iron core material as a means for suppressing heat generation (the reduction in iron loss), and a means for increasing a wire diameter of the winding coil (a reduction in resistance). In addition, up to now, for the rotors, most of studies of enhancing cooling performance and heat dissipating performance have been performed.

In addition, as a temperature of the iron core is increased due to hysteresis loss and eddy current loss, a temperature of the winding coil is increased, thus the temperature of the coil is increased due to copper loss caused by an increase in the resistance of the coil, so that there is a problem in that the life-span and reliability of a polymer material used for the winding coil are degraded.

The existing internal combustion engine employs spray-type oil cooling or the like for the magnet generator. However, effective oil cooling for an easily heated output aligning unit (connecting portion of the winding coil and a lead) in the stator has a limitation on a layout of an oil circulation passage.

On the other hand, recently, the outputs of magnet generators have shown a tendency to increase, and multi-polarization is proceeding for magnetic poles of the iron core and magnetic poles of the magnet. At the same time, there is an urgent need to reduce heat generation caused by power generation.

Moreover, since the laminated core (stator) of the existing magnet generator is promoting a reduction in the size (thickness) of a mounting space, it becomes difficult to have a complex cooling structure.

SUMMARY OF THE INVENTION

In order to solve the existing problems, an object of the invention is to provide a magnet generator for generating power using a winding coil on a side of a stator while a flywheel which is a rotor rotates, the magnet generator being capable of satisfying functions of an existing laminated core, suppressing an increase in temperature of the iron core by enhancing cooling performance and heat dissipation performance of the laminated core itself while maintaining productivity, and enhancing power generation efficiency and reliability by reducing heat generation of the winding coil.

According to an aspect of the invention, a magnet generator includes: a flywheel which is a bowl-shaped rotor; a plurality of magnets which are installed on an inner peripheral surface of a cylindrical part of the flywheel; and a stator which includes a laminated core and a winding coil wound around the laminated core installed to be opposed to the magnets inside the flywheel to generate power by an electromagnetic induction between the winding coil and the magnet, wherein a temperature increase suppressing component is disposed in the stator to suppress heat generation of the laminated core and the winding coil.

In addition, as the temperature increase suppressing component, a heat dissipation enhancing member which has no relation with a magnetic circuit fitted into a space formed by cutting a bulk of the laminated core used for configuring the magnetic circuit, and a cooling tube installed to be inserted into or penetrate the heat dissipation enhancing member are provided. In addition, cooling performance of the stator is enhanced by supplying a cooling medium to the cooling tube.

According to the magnet generator of the invention, by allowing the cooling medium to circulate through the cooling tube which is the temperature increase suppressing component provided in the laminated core used for configuring the stator, the cooling performance (heat dissipating performance) of the laminated core itself is enhanced with the low cost cooling structure, and it is possible to suppress an increase in temperature of the iron core and reduce copper loss due to the increase in temperature of the winding coil.

In addition, the iron core used for configuring the magnetic field circuit (back yoke), as compared with a laminated core having the same laminate thickness which is slightly smaller than that of the existing structure, has a low iron core temperature and reduced copper loss (temperature of the winding coil), so that it is possible to obtain the same or higher power generation ability (output current) or the like and it is possible to obtain the magnet generator with significantly enhanced power generation efficiency and reliability.

The foregoing and other objects, features, aspects, and advantages of the present invention will become more apparent from the following detailed description of the present invention when taken in conjunction with the accompanying drawings.

BRIEF DESCRIPTION OF THE DRAWINGS

FIGS. 15A to 15E are diagrams schematically illustrating various examples of a shape of a heat dissipation member used for a magnet generator according to a sixth embodiment of the invention.

FIGS. 16A and 16B are cross-sectional views schematically illustrating an example of an existing flywheel-type magnet generator.

FIG. 17 is a diagram illustrating a state when the existing magnet generator is mounted to a rotation shaft of an internal combustion engine or the like.

DETAILED DESCRIPTION OF THE PREFERRED EMBODIMENTS

Figure 1:
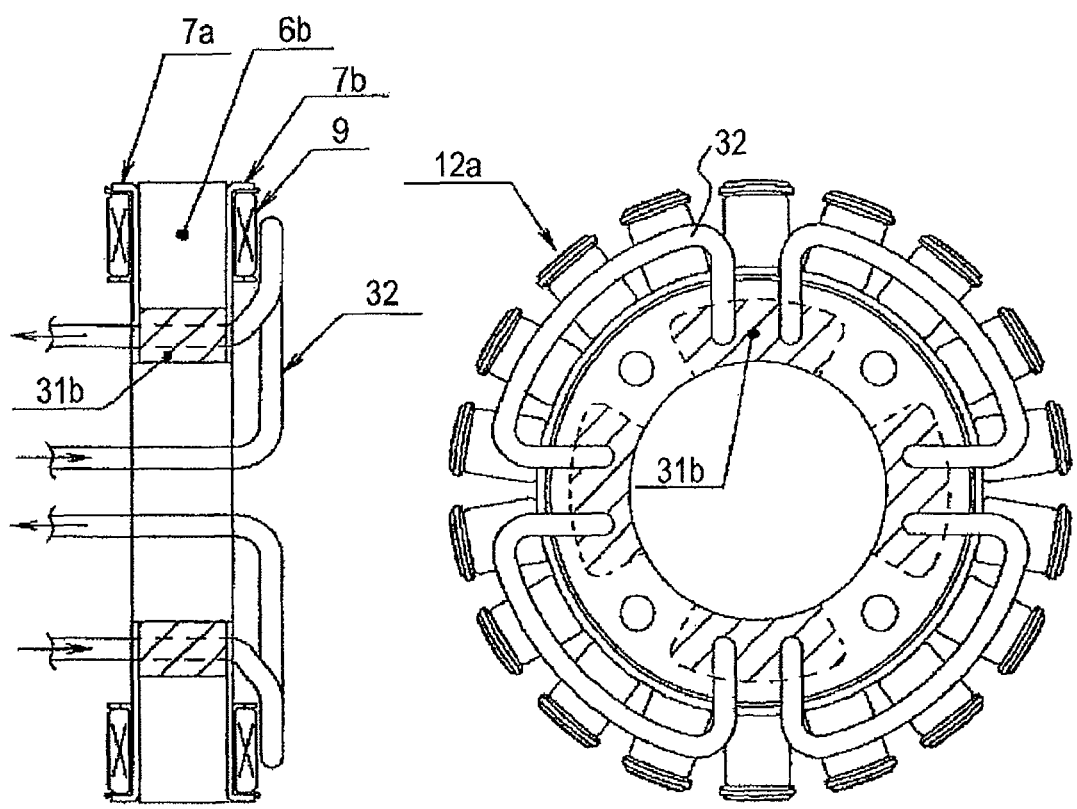
FIGS. 1A and 1B are cross-sectional view schematically illustrating a stator part of a magnet generator according to a first embodiment of the invention.

Hereinafter, exemplary embodiments of the invention will be described with reference to the accompanying drawings. In addition, in the drawings, like reference numerals denote like elements.

First Embodiment

Figure 2:
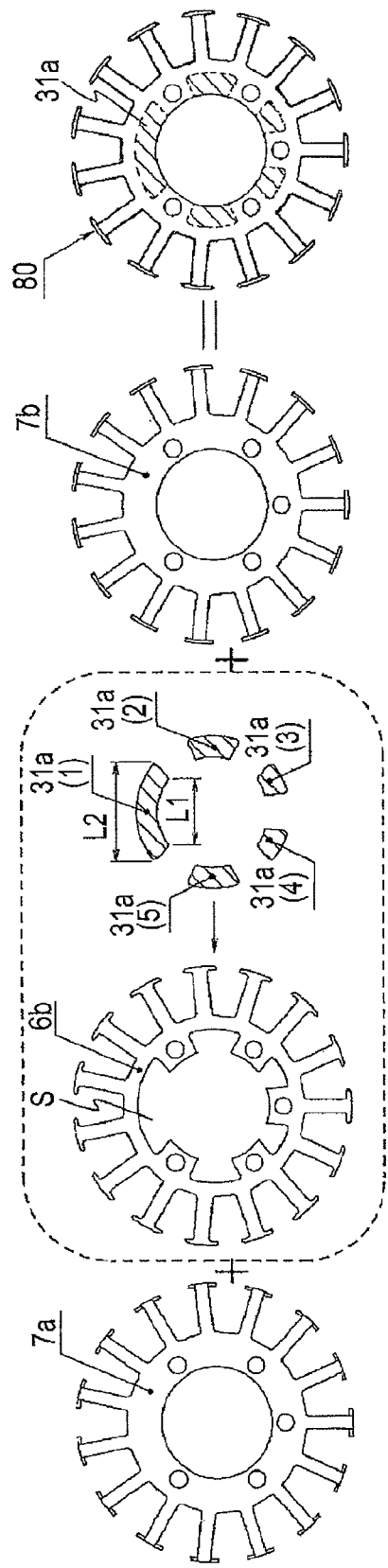
FIG. 2 is a diagram for explaining an example of a manufacturing process of a laminated core according to the first embodiment of the invention.

FIGS. 1A and 1B illustrate a stator part of a magnet generator according to a first embodiment of the invention. FIG. 1A is a side cross-sectional view, and FIG. 1B is a plan cross-sectional view. In FIGS. 1A and 1B, reference numeral 12a denotes a stator of the magnet generator. As illustrated in FIG. 2 described later, a heat dissipation enhancing member (hereinafter, simply referred to as a heat dissipation member) 31b is fitted into a space formed by cutting a bulk of an iron core 6b (thin steel sheet) used for configuring a magnetic field circuit, and a cooling tube 32 is allowed to penetrate the laminated core which is configured by blocking both side surfaces thereof with single plates 7a and 7b and is then distributed freely in the vicinity of a winding coil 9, thereby enhancing heat dissipation performance and cooling performance of the laminated core itself of the stator and suppressing a temperature increase in the winding coil 9. In addition, the cooling tube 32 is provided with a plurality of holes on the stator side (substantially in a shower head shape), so that in the existing stator it is possible to actively cool an easily heated output aligning unit (a connection part for connection between the winding coil and a lead), and the winding coil 9 on an upper part which reaches a high temperature when in a mounted posture.

FIGS. 2A to 2D are diagrams for explaining an example of a manufacturing process of the laminated core according to the first embodiment described above. As described above in FIG. 18, the thin steel sheets 6a and the single plates 7a and 7b on both sides thereof, which constitute the existing laminated core, are mainly made of a magnetic material (for example, a cold rolling steel sheet such as SPCC). However, in the first embodiment, as illustrated in FIG. 2, a laminated core 80 is formed by fitting aluminum-based heat dissipation members 31a(1) to 31a(5) into a space S of a thin steel sheet (intermediate plate) 6b configured by cutting the iron core part (which is not influenced by stiffness degradation (axial force during fastening of a bolt) and power generation characteristics) other than a mounting hole part 5 of the laminated core used for constituting a magnetic circuit and blocking the members with single plates (end plates) 7a and 7b as in the existing manner.

As described above, according to the laminated core 80 configured by fitting the heat dissipation member 31a between the single plates (end plates) 7a and 7b, it is possible to add the heat dissipation member 31a without a change in the manufacturing process of the laminated core, and since a specific gravity coefficient thereof is reduced to 2.8 g/cm$^3$ (aluminum-based) from 7.8 g/cm$^3$ (iron-based), this configuration achieves a weight reduction means to reduce a weight of the iron core at the same volume.

Figure 18:
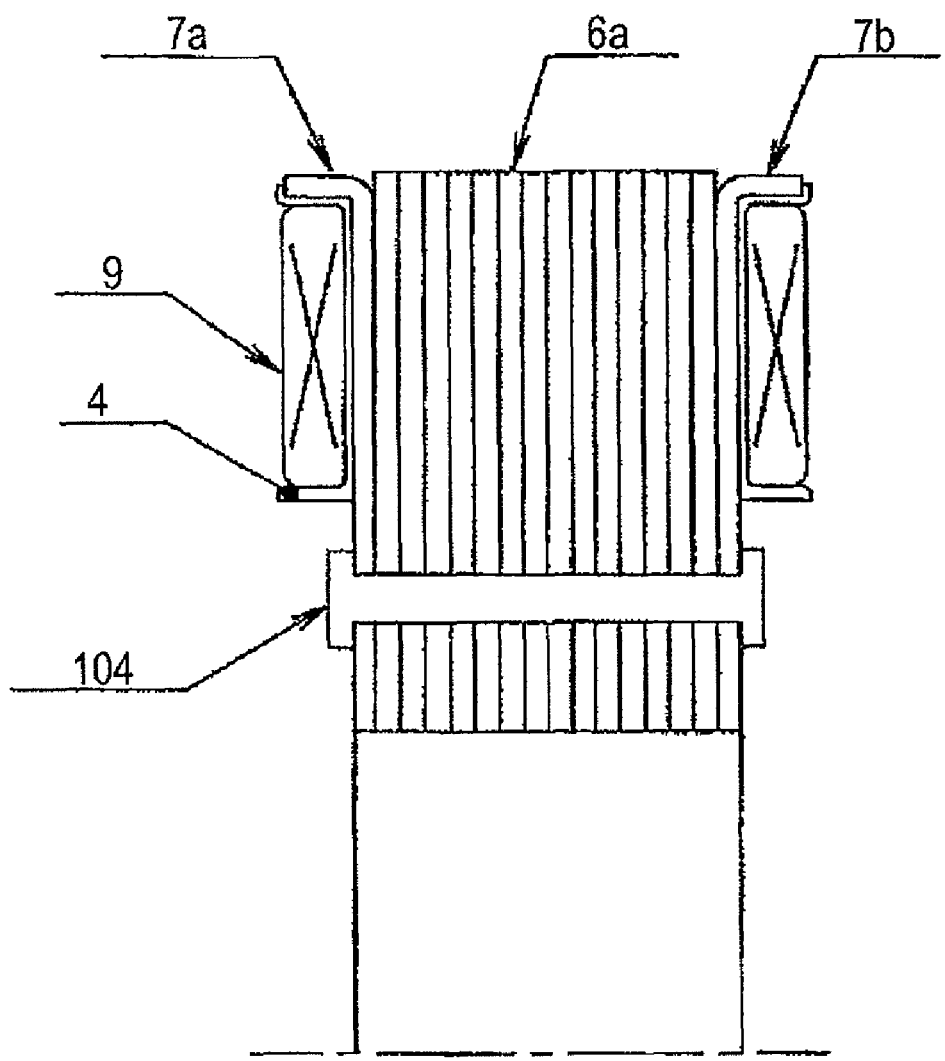
FIG. 18 is a diagram illustrating an example of an existing laminated core.

Further, in order to ensure the volume of the heat dissipation member 31a as much as possible, the laminated core 80 in FIG. 2 does not use the plurality of existing caulking members 104 illustrated in FIG. 18 and is put together by fitting the thin steel sheets 6b with the single plates 7a and 7b on both sides thereof so as to be unevenly laminated.

In addition, as illustrated by the heat dissipation member 31a(1), by allowing an arc L2 on an outer peripheral side to be greater than an arc L1 on an inner peripheral side, the heat dissipation member 31a is prevented from being separated from the laminated core by a mounting posture (being vertically positioned). Of course, in a case of being horizontally positioned, it is inserted between the single plates 7a and 7b on both sides thereof, so that it does not fall out from the laminated core.

Figure 3A:
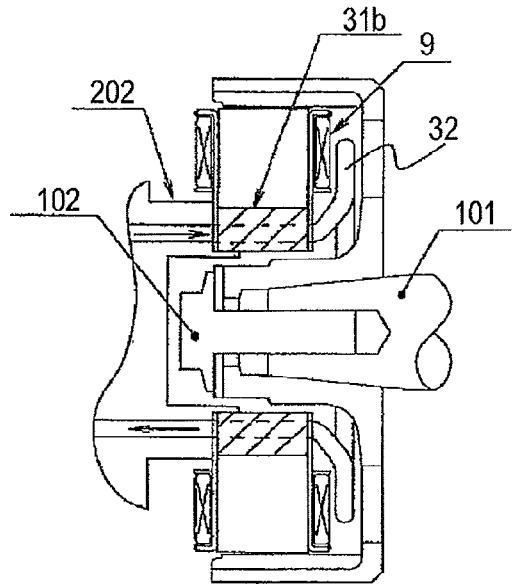
FIGS. 3A and 3B are diagrams illustrating a state when the magnet generator according to the first embodiment is mounted to a rotation shaft of an internal combustion engine or the like, and is an explanatory view related to a method of supplying a cooling medium circulating through a cooling tube.
Figure 3B:
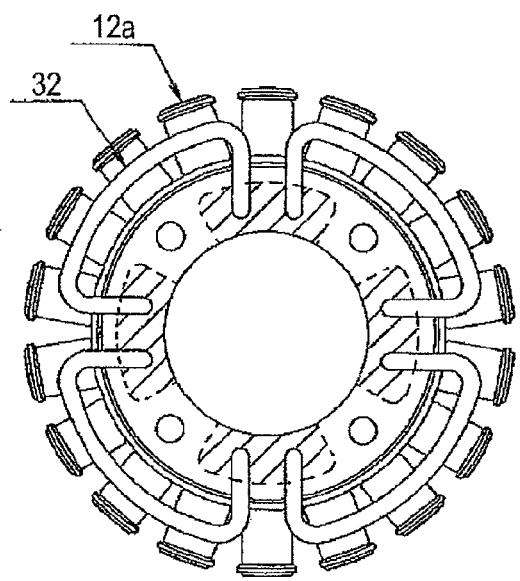

Next, a method of supplying a cooling medium that circulates through the cooling tube 32 will be described with reference to FIGS. 3A and 3B. FIGS. 3A and 3B are diagrams illustrating a state when the stator 12a of the magnet generator is fastened (mounted) to a rotation shaft 101 of an internal combustion engine or the like by a flange bolt 102.

Cooling water and engine coils that circulate inside the internal combustion engine can be circulated and supplied to the cooling tube 32 by connecting a circulation passage provided in an engine case cover and an engine block 202 to the cooling tube 32 (using tube press-fitting or a seal member). Of course, since the engine case cover is sealed with an engine body by a gasket or the like, there is no problem even if oil leaks from the connection part between an oil circulation passage and the cooling tube 32. In addition, a cooling effect can be controlled according to a flow rate of the cooling medium, as well as the number of distributed cooling tubes and their positions. As a material of the cooling tube 32, according to the invention, an aluminum material or a stainless steel material is used in consideration of heat dissipation performance, machining performance and non-magnetism (does not affect a magnetic circuit) of a distribution contour. The fixing (positioning) of the cooling tube and the laminated core can be achieved by press-fitting, caulking in the vicinity of the single plates (end plates) on both sides of the laminated core, or the like.

Figure 4:
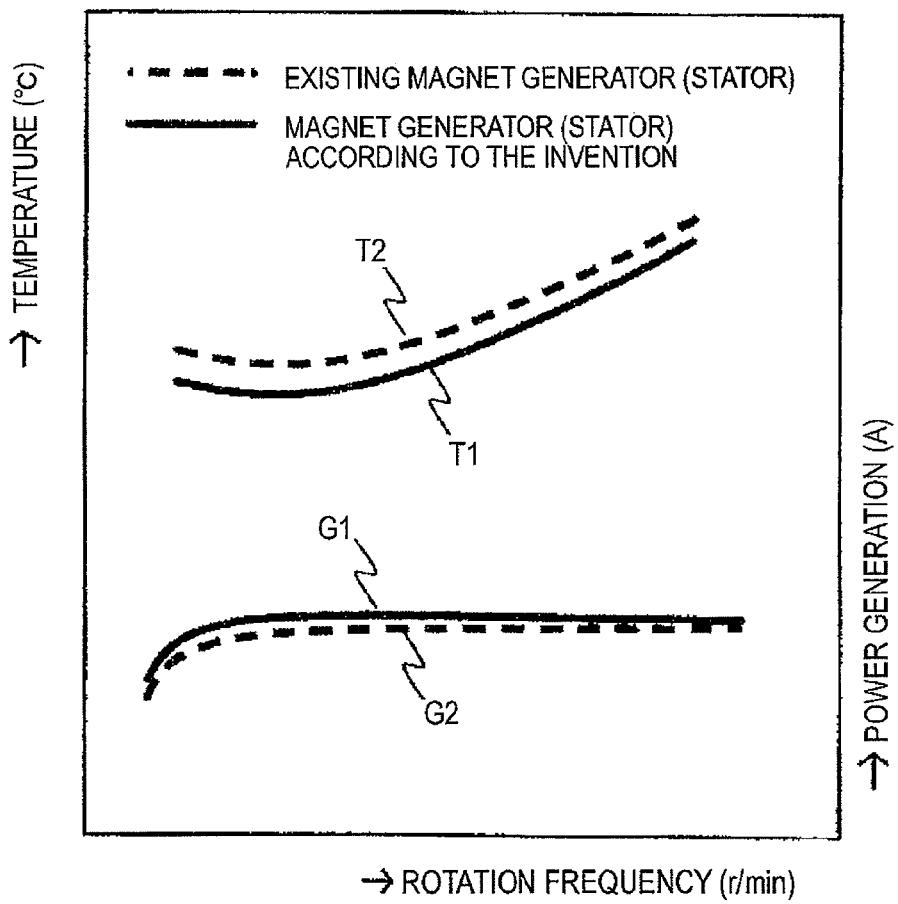
FIG. 4 is a diagram showing rotation frequency and temperature (heat generation) characteristics, as well as power generation (output current) characteristics of the magnet generator according to the first embodiment of the invention.

FIG. 4 shows a rotation frequency, and temperature (heat generation) and power generation (output current) characteristics of the magnet generator according to the first embodiment. In FIG. 4, a horizontal axis represents a drive rotation frequency (r/min) of the magnet generator, a vertical axis on the left represents a saturation temperature (° C.) due to heat generation (iron loss+copper loss) of the magnet generator, and a vertical axis on the right represents an output current (A) of the winding coil. In addition, full lines T1 and G1 represent temperature characteristics and power generation characteristics of the first embodiment, respectively, and dashed lines T2 and G2 represent temperature characteristics and power generation characteristics of an existing apparatus, respectively. As is clear from the figure, an obvious temperature difference (heat reduction due to the cooling effect) can be seen resulting from the cooling structure (the cooling tube and the heat dissipation member) provided in the laminated core.

In addition, even though the amount of the iron core for configuring the magnetic field circuit with the same laminate thickness is reduced (back yoke reduction=reduction in area through which magnetic flux passes), a temperature increase (heat generation) is reduced, whereby a power generation amount is increased as illustrated in FIG. 4.

As described above, in the magnet generator according to the first embodiment of the invention, a heat dissipation enhancing member which is a different member from the laminated core (magnetic circuit) is fitted into a space part which is formed by cutting the bulk of the laminated core for configuring the magnetic circuit, and the cooling tube is allowed to pass though the heat dissipation enhancing member. Therefore, without a change in the manufacturing method of the existing laminated core, it is possible to configure the stator having the cooling structure at low cost while maintaining functions of the laminated core. In addition, it is possible to significantly enhance the cooling operations of the laminated core and the winding coil and heat dissipation performance of the laminated core.

Second Embodiment

Figure 5A:
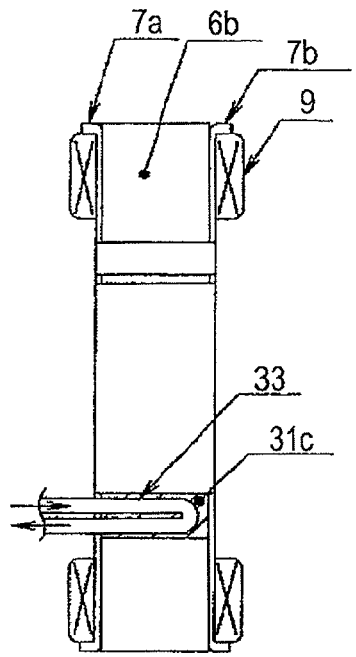
FIGS. 5A and 5B are cross-sectional views schematically illustrating a stator part of a magnet generator according to a second embodiment of the invention.
Figure 5B:
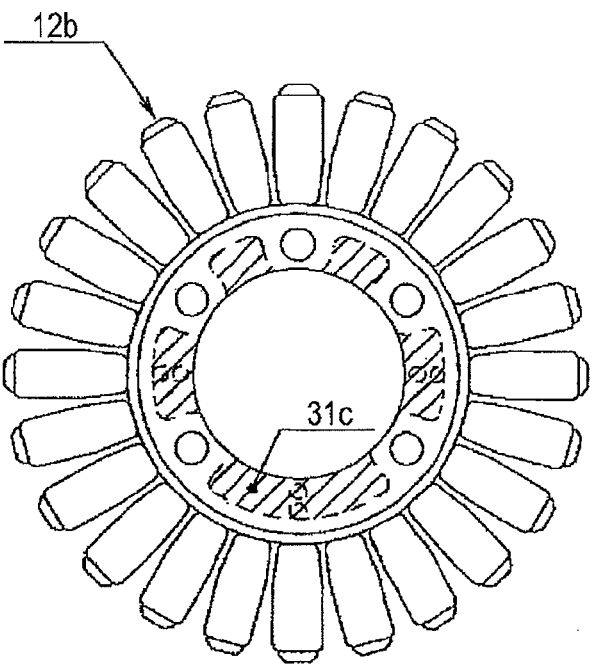

FIGS. 5A and 5B illustrate a stator part of a magnet generator according to a second embodiment of the invention. FIG. 5A is a side cross-sectional view, and FIG. 5B is a plan cross-sectional view.

In the second embodiment of the invention illustrated in FIGS. 5A and 5B, a stator 12b of the magnet generator is illustrated in a case where a clearance between the winding coil 9 and an inner side of a bottom part of the flywheel (not shown) is insufficient and the cooling tube cannot be distributed on the winding coil 9 side.

In the second embodiment, the configuration of the laminated core is the same as that in the first embodiment. However, unlike the heat dissipation member 31b of the first embodiment in which a through-hole is provided in the heat dissipation member to distribute the cooling tube to the vicinity of the winding coil 9, by a cooling tube 33 folded (or inserted inside the heat dissipation member 31c) inside the heat dissipation member 31c as the blocking hole, the heat dissipation performance and cooling performance of the laminated core can be enhanced.

Third Embodiment

FIGS. 6A to 9B illustrate a stator part of a magnet generator according to a third embodiment of the invention. FIGS. 6A, 7A, 8A, and 9A are side cross-sectional views, and FIGS. 6B, 7B, 8B, and 9B are plan cross-sectional views.

In the third embodiment of the invention illustrated in FIGS. 6A to 9B, a case where a cooling tube cannot be installed due to a configuration of an engine or due to a layout is illustrated.

Figure 6A:
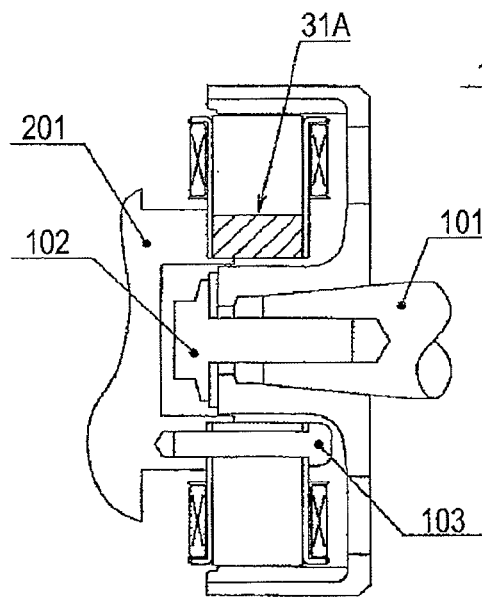
FIGS. 6A and 6B are cross-sectional views schematically illustrating an example of a stator part of a magnet generator according to a third embodiment of the invention.
Figure 6B:
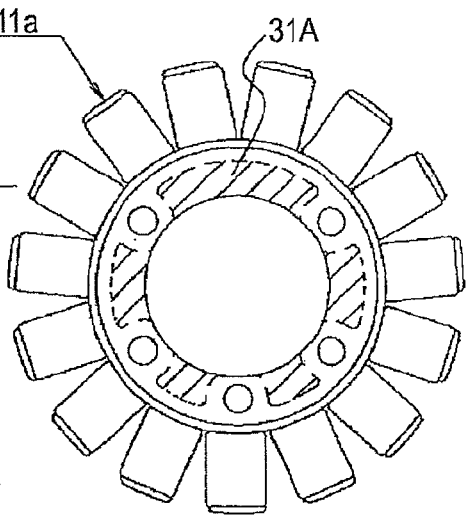

FIGS. 6A and 6B illustrate a magnet generator which is mounted to an internal combustion engine shaft 101 by a flange bolt 102, and in the magnet generator illustrated in FIGS. 5A and 5B, a stator 11a according to the invention is fastened and fixed to the existing engine case cover (engine block) 201 which is not provided with a cooling medium passage, by a mounting bolt 103. In the stator 11a, only a heat dissipation member 31A such as an aluminum member is interposed between end plates of the laminated core. In a case where it is difficult for a cooling medium to circulate unlike the configuration of FIGS. 1A and 1B, heat received from the engine case cover (engine block) 201 and a temperature increase due to the winding coil 9 can be actively dissipated from the laminated core by the heat dissipation member 31A, so that heat generation can be suppressed.

Figure 7A:
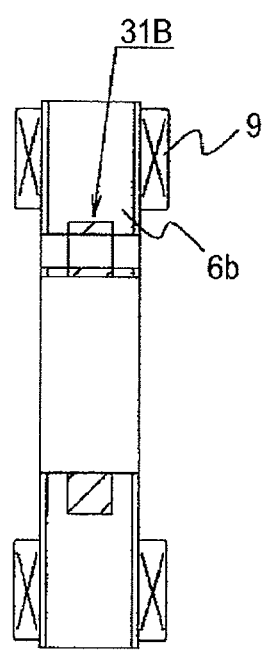
FIGS. 7A and 7B are cross-sectional views schematically illustrating another example of the stator part of the magnet generator according to the third embodiment of the invention.
Figure 7B:
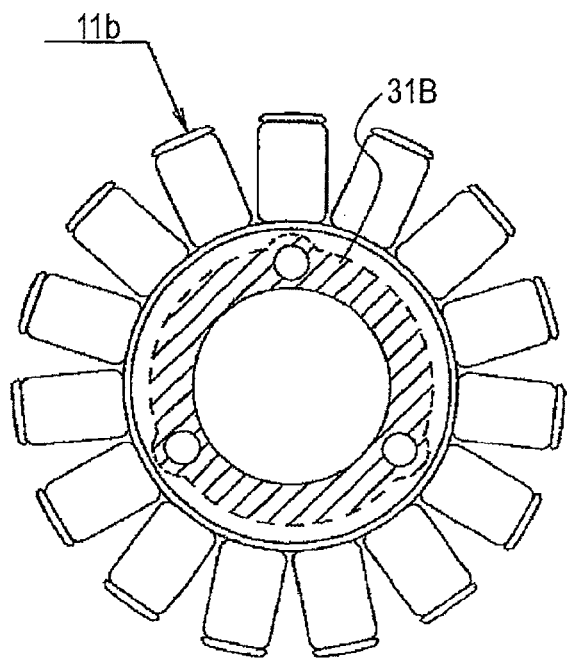

FIGS. 7A and 7B illustrate a modified example of the magnet generator of FIGS. 6A and 6B. In a stator 11b of FIGS. 7A and 7B, a heat dissipation member 31B is provided only in the thin steel sheet 6b (in the intermediate plate) of the laminated core, and heat dissipation performance is enhanced while solving a concern about a reduction in stiffness caused by a reduction in the iron core bulk of the laminated core.

Figure 8A:
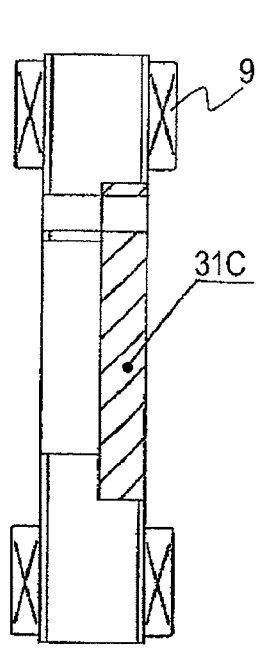
FIGS. 8A and 8B are cross-sectional views schematically illustrating another example of the stator part of the magnet generator according to the third embodiment of the invention.
Figure 8B:
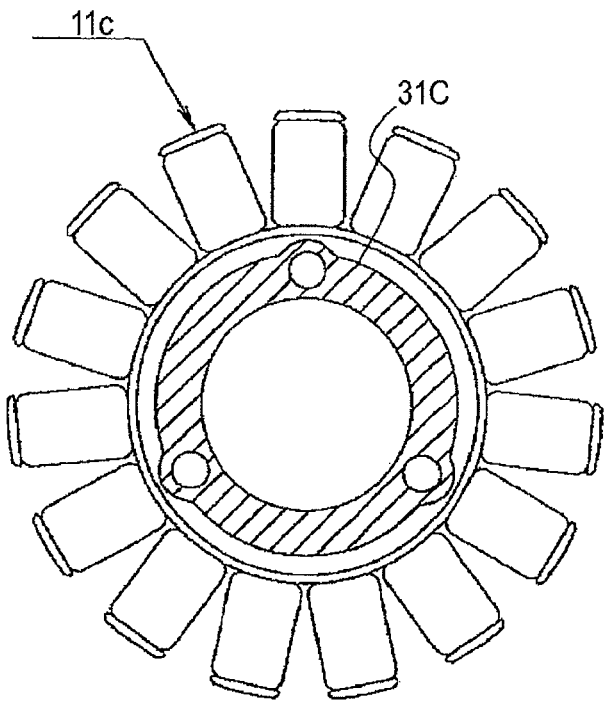

In addition, in a stator 11c of FIGS. 8A and 8B, an iron core amount of only one side of the laminated core is cut, and a heat dissipation member 31C is provided on only one side surface, thereby enhancing heat dissipation performance while minimizing the influence of the magnetic circuit.

Figure 9A:
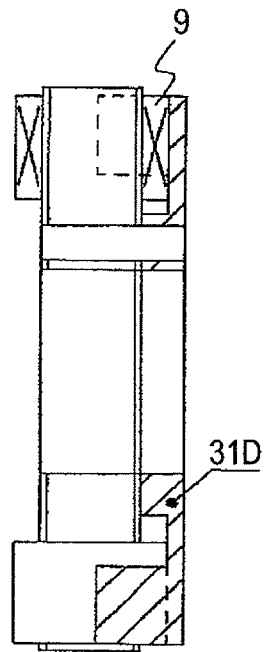
FIGS. 9A and 9B are cross-sectional views schematically illustrating another example of the stator part of the magnet generator according to the third embodiment of the invention.
Figure 9B:
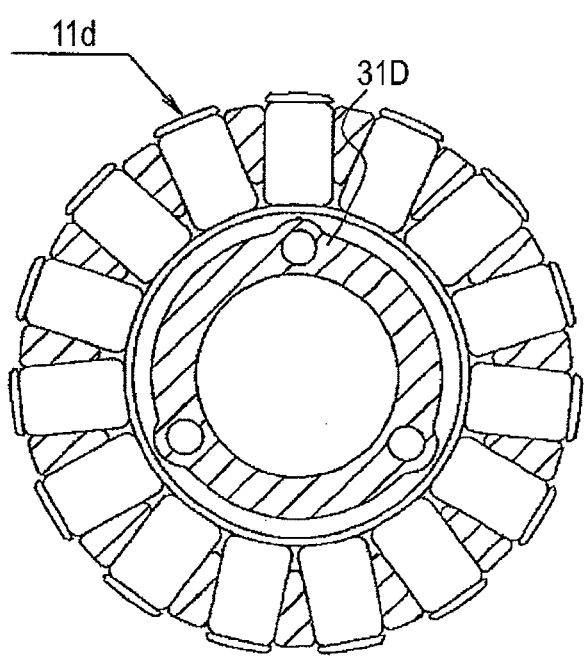

Moreover, in a stator 11d of FIGS. 9A and 9B, on the base of the embodiment of the stator 11c of FIGS. 8A and 8B, a heat dissipation member 31D whose volume is expanded to the vicinity of the winding coil 9 is provided (between the one side surface of the laminated core and the magnetic pole of the stator substantially having a claw pole shape), thereby maximizing heat dissipation performance.

Fourth Embodiment

Figure 10A:
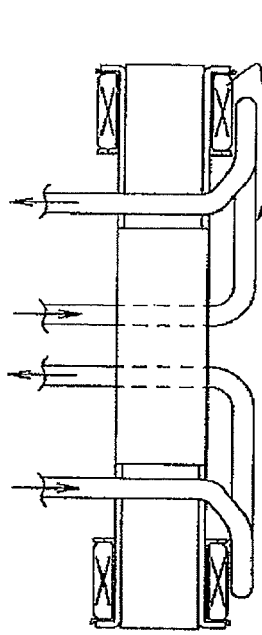
FIGS. 10A and 10B are cross-sectional views schematically illustrating an example of a stator part of a magnet generator according to a fourth embodiment of the invention.
Figure 10B:
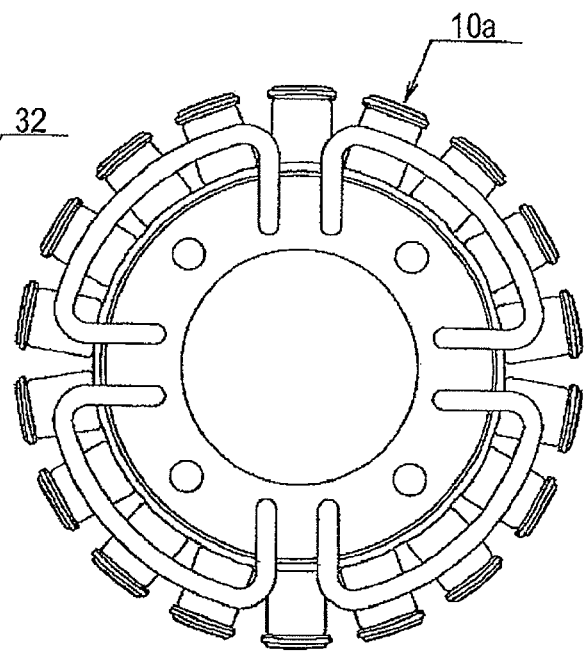
Figure 11A:
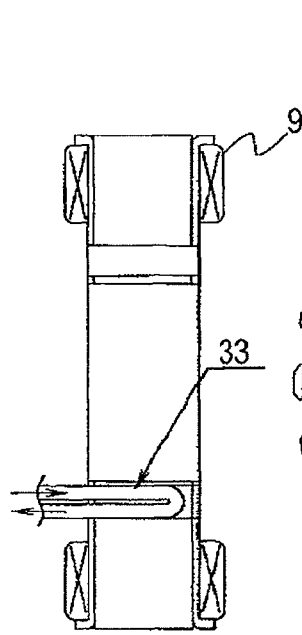
FIGS. 11A and 11B are cross-sectional views schematically illustrating another example of the stator part of the magnet generator according to the fourth embodiment of the invention.
Figure 11B:
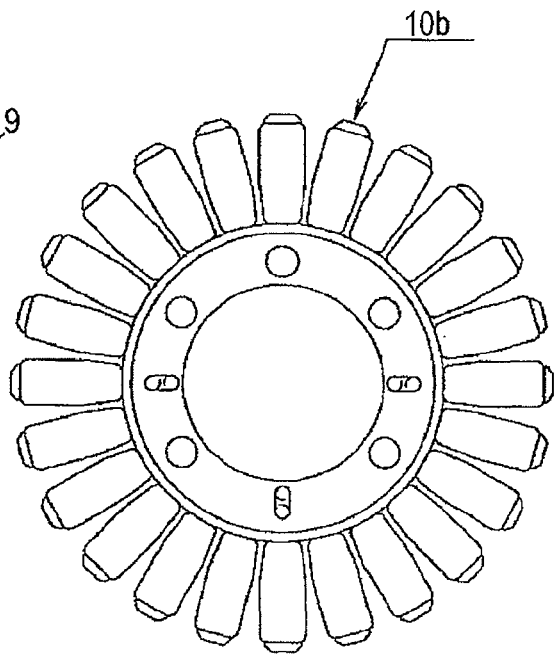
Figure 12:
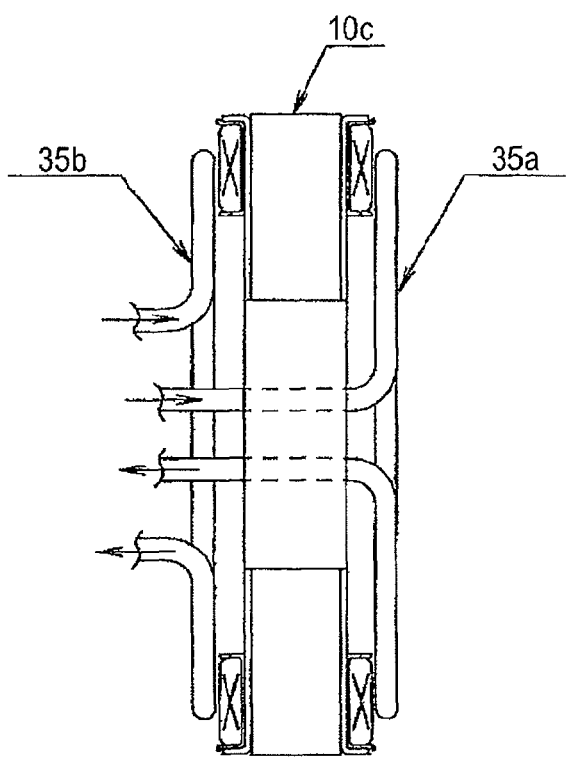
FIG. 12 is a cross-sectional view schematically illustrating another example of the stator part of the magnet generator according to the fourth embodiment of the invention.
Figure 13:
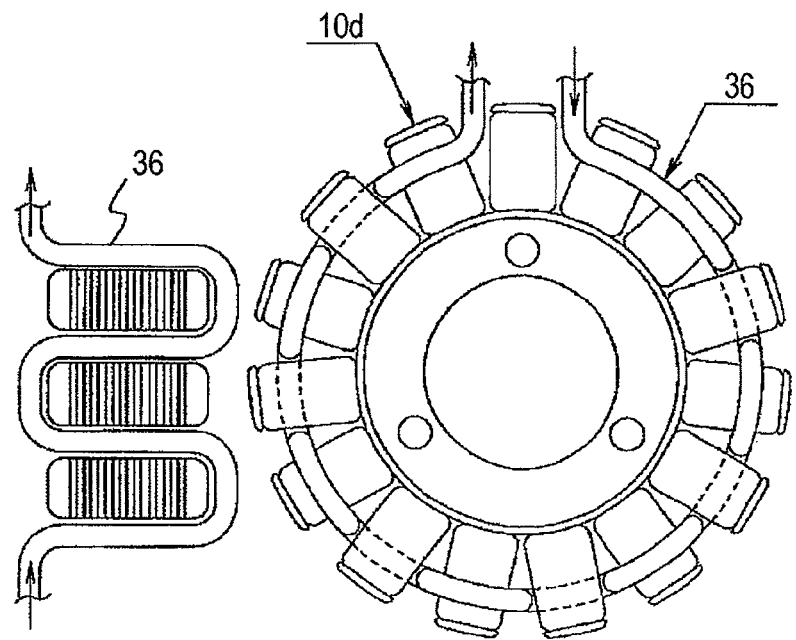
FIG. 13 is a cross-sectional view schematically illustrating another example of the stator part of the magnet generator according to the fourth embodiment of the invention.

FIGS. 10A to 13 illustrate a stator part of a magnet generator according to a fourth embodiment of the invention. FIGS. 10A and 11A are side cross-sectional views, FIGS. 10B and 11B are plan cross-sectional views, and FIGS. 12 and 13 are explanatory views illustrating an arrangement of a cooling tube.

The magnet generator according to the fourth embodiment of the invention is provided with only the cooling tube while retaining the existing laminated core.

In a stator 10a of FIGS. 10A and 10B, a cooling tube 32 is allowed to pass through the laminated core to be distributed to the vicinity of the winding coil 9, thereby enhancing the cooling performance of the laminated core and winding coil.

In a stator 10b of FIGS. 11A and 11B, in a case where there is no sufficient space in the vicinity of the winding coil 9, the cooling tube 33 is folded within the laminate thickness of the laminated core, or is inserted into the laminated core, thereby enhancing the cooling performance of the stator.

In FIG. 12, in a stator 10c in which the existing laminated core is provided with only the cooling tube, cooling tubes 35a and 35b are disposed on both sides of the laminated core, thereby suppressing heat generation of the winding coil 9 as described above.

Further, in a stator 10d of FIG. 13, a cooling tube 36 which is alternately distributed on front and rear sides between magnetic poles in an S shape is provided in the existing stator, thereby enhancing the cooling performance of the stator.

Fifth Embodiment

Figures 14A, 14B:
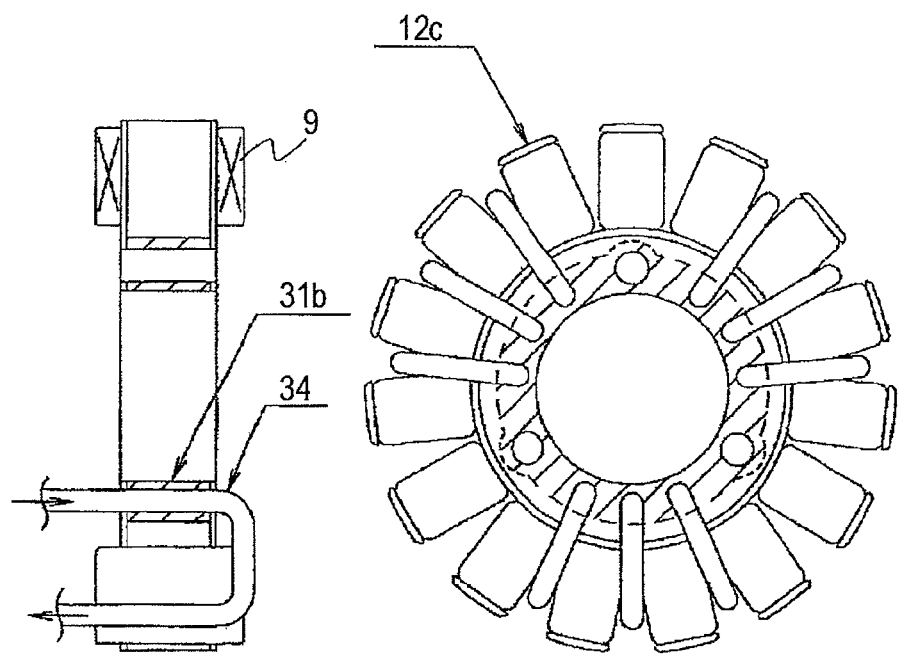
FIGS. 14A and 14B are cross-sectional views schematically illustrating a stator part of a magnet generator according to a fifth embodiment of the invention.

FIGS. 14A and 14B illustrate a stator part of a magnet generator according to a fifth embodiment of the invention. FIG. 14A is a side cross-sectional view, and FIG. 14B is a plan cross-sectional view.

In the magnet generator according to the fifth embodiment of the invention, a case where there is no limitation on layout or space is exemplified. As illustrated in FIGS. 14A and 14B, a stator 12c according to the fifth embodiment includes the heat dissipation member 31b provided inside the laminated core and the cooling tube 34 that penetrates through the laminated core and is distributed to cover the winding coil (substantially into a rake shape), thereby suppressing heat generation of the winding coil 9.

Sixth Embodiment

FIGS. 15A to 15E illustrate a sixth embodiment of the invention and illustrate various examples of a shape of a heat dissipation member used for the magnet generator of the invention.

The heat dissipation member used for the magnet generator of the invention described above is fitted into a space formed by laminating the thin steel sheets (intermediate plates) 6b provided with a space formed by cutting an iron core part, and both side surfaces are blocked by the single plates 7a and 7b to be mounted to the laminated core. However, due to variations of the laminate thickness after caulking of the laminated core and fitting due to the uneven laminate, an uneven clearance occurs in the laminate direction, so that it becomes difficult to set the thickness dimensions of the heat dissipation member. Therefore, according to the invention, the influence of the laminate thickness is not significantly received due to the shape of the heat dissipation member, and the heat dissipation member can be provided inside the laminated core.

In a heat dissipation member 31e illustrated in FIG. 15A, in the heat dissipation member of which a laminate thickness is set to be the maximum value, a wedge-shaped space is formed in a central part in the thickness direction (openings on sites subjected to caulking or fitting are provided), and when laminate loads are applied to the end plates 7a and 7b of the laminated core, the height can be changed in accordance with the thickness of a joining part. Of course, although the thickness of the opposite side to the joining part is maximized (curved plane), the laminate stiffness has importance as the laminate clearance is not provided in the joining part.

Similarly, an example of the heat dissipation member is illustrated in which the height of the heat dissipation member 31f of FIG. 15B is changed in accordance with the thickness of the joining part when the laminate loads for caulking are applied to the iron core.

On the other hand, FIGS. 15C and 15D show an example of a case where the thickness of the heat dissipation member and the thickness of the laminated core need to be equal in terms of the anti-vibration performance of the laminated core and the precision of the mounting plane.

In the heat dissipation member 31g of FIG. 15C, a through-hole or a porous clearance is provided in the central part of the heat dissipation member, and when the laminate loads are applied, the height of the heat dissipation member is changed as the clearance is changed from a circular shape to an elliptical shape in accordance with the thickness of the joining part.

On the contrary, FIG. 15D illustrates an example of a case where deformation sites are set on both end surfaces of the heat dissipation member 31h. Specifically, both end surfaces are formed to have screw thread shapes (knurling), so that when laminate loads are applied, the height is changed to deform the apex part which is weak in strength in accordance with the thickness of the joining part.

Further, in a heat dissipation member 31j of FIG. 15E, an example of a shape thereof is illustrated in which a surface which is mounted to the internal combustion engine (engine case cover) or the like and receives a large amount of heat is configured substantially into a heat sink shape to achieve an increase in surface area, thereby also enhancing heat dissipation performance.

As described above in the first to sixth embodiments, according to the magnet generator of the invention, in the magnet generator provided with the flywheel that is the bowl-shaped rotor, the plurality of magnets installed on the inner peripheral surface of the cylindrical part of the flywheel, and the stator having the laminated core and the winding coil wound around the laminated core installed to be opposed to the magnets inside the flywheel to generate power by an electromagnetic induction between the winding coil and the magnet, temperature increase suppressing components such as the cooling tube and the heat dissipation enhancing member are disposed in the stator, and the heat generation of the laminated core and the winding coil is suppressed by the temperature increase suppressing components. Therefore, the cooling operation of the laminated core and the winding coil and the heat dissipation performance of the laminated core are enhanced by the stator having the low cost cooling structure, thereby obtaining the magnet generator with significantly enhanced power generation efficiency and reliability.

Various modifications and alterations of this invention will be apparent to those skilled in the art without departing from the scope and spirit of this invention, and it should be understood that this is not limited to the illustrative embodiments set forth herein.

What is claimed is:

1. A magnet generator comprising:
a flywheel which is a bowl-shaped rotor;
a plurality of magnets which are installed on an inner peripheral surface of a cylindrical part of the flywheel; and
a stator which includes a laminated core and a winding coil wound around the laminated core installed to be opposed to the magnets inside the flywheel to generate power by an electromagnetic induction between the winding coil and the magnet,
wherein a temperature increase suppressing component is disposed in the stator to suppress heat generation of the laminated core and the winding coil,
wherein, as the temperature increase suppressing component, a heat dissipation enhancing member which has no relation with a magnetic circuit is fitted into a space formed by cutting a bulk of the laminated core used for configuring the magnetic circuit, and a cooling tube installed to be inserted into or penetrate the heat dissipation enhancing member are provided,
heat dissipation performance of the stator is enhanced by the heat dissipation enhancing member, and
cooling performance of the stator is enhanced by supplying a cooling medium to the cooling tube.

2. The magnet generator according to claim 1, wherein the heat dissipation enhancing member is an aluminum member.

3. A magnet generator comprising:
a flywheel which is a bowl-shaped rotor;
a plurality of magnets which are installed on an inner peripheral surface of a cylindrical part of the flywheel; and
a stator which includes a laminated core and a winding coil wound around the laminated core installed to be opposed to the magnets inside the flywheel to generate power by an electromagnetic induction between the winding coil and the magnet,
wherein a temperature increase suppressing component is disposed in the stator to suppress heat generation of the laminated core and the winding coil,
wherein, as the temperature increase suppressing component, a cooling tube installed to be inserted into or penetrate an interior portion of the laminated core is provided, and
cooling performance of the stator is enhanced by supplying a cooling medium to the cooling tube.

4. The magnet generator according to claim 3,
wherein the cooling tube is allowed to penetrate the laminated core, and
the cooling tube is distributed to a vicinity of the winding coil.

5. The magnet generator according to claim 3, wherein the cooling tube is folded within a laminate thickness of the laminated core.

6. The magnet generator according to claim 3, wherein the cooling tube is disposed on both sides of the laminated core.

7. The magnet generator according to claim 3, wherein the cooling tube is distributed alternately on front and rear sides between magnetic poles of the stator in an S shape.

8. A magnet generator comprising:
a flywheel which is a bowl-shaped rotor;
a plurality of magnets which are installed on an inner peripheral surface of a cylindrical part of the flywheel; and
a stator which includes a laminated core and a winding coil wound around the laminated core installed to be opposed to the magnets inside the flywheel to generate power by an electromagnetic induction between the winding coil and the magnet,
wherein a temperature increase suppressing component is disposed in the stator to suppress heat generation of the laminated core and the winding coil,
wherein, as the temperature increase suppressing component, a heat dissipation enhancing member which has no relation with a magnetic circuit is fitted into a space formed by cutting a bulk of the laminated core used for configuring the magnetic circuit is provided, and
heat dissipation performance of the stator is enhanced by the heat dissipation enhancing member.

9. The magnet generator according to claim 8, wherein the heat dissipation enhancing member is installed between end plates of the laminated core, and is allowed to have the same thickness as that of the laminated core.

10. The magnet generator according to claim 8, wherein the heat dissipation enhancing member is installed inside an intermediate plate of the laminated core, and is allowed to have a thickness smaller than that of the laminated core.

11. The magnet generator according to claim 8, wherein the heat dissipation enhancing member is installed only on one side surface of the laminated core.

12. The magnet generator according to claim 8, wherein the heat dissipation enhancing member is installed on one side surface of the laminated core to expand to a vicinity of the winding coil.

13. The magnet generator according to claim 8, wherein the heat dissipation enhancing member is an aluminum member.

* * * * *